ns
United States

[11] 3,609,003

| [72] | Inventor | Anthony Siksai<br>2705 Lahser Road, Bloomfield Hills, Mich. 48013 |
|---|---|---|
| [21] | Appl. No. | 709,138 |
| [22] | Filed | Feb. 28, 1968 |
| [45] | Patented | Sept. 28, 1971<br>Continuation-in-part of application Ser. No. 197,128, May 23, 1962, now abandoned. |

[54] ANIMATED DISPLAY DEVICE
10 Claims, 3 Drawing Figs.

[52] U.S. Cl. ................................ 350/157, 350/159
[51] Int. Cl. .................................. G02b 1/24
[50] Field of Search ......................... 350/153, 155, 157, 167; 40/106, 51, 53

[56] References Cited
UNITED STATES PATENTS

| 2,700,919 | 2/1955 | Boone ..................... | 350/157 |
| 3,258,868 | 7/1966 | Taylor, Jr. et al. ......... | 40/106.53 |
| 3,315,391 | 4/1967 | Lane et al. ................ | 350/147 UX |

*Primary Examiner*—David Schonberg
*Assistant Examiner*—Michael J. Tokar
*Attorney*—Lane, Aitken, Dunner & Ziems

ABSTRACT: A device for animating a picture painted on a transparency. A light-intercepting sheet having a pattern of embossed motion lines overlies portions of the picture to be animated an the two are sandwiched between rotary and stationary polarized sheets. The picture becomes animated when the rotary polarizer is rotated and light is transmitted through the sheets in a manner to illuminate the picture.

PATENTED SEP 28 1971 3,609,003

INVENTOR
Anthony Siksai

BY Lane, Aitken, Dunner + Ziems
ATTORNEYS

3,609,003

ANIMATED DISPLAY DEVICE

The present invention is an improvement over the animated display device disclosed and claimed in my copending application Ser. No. 369,942 filed on May 25, 1964 now U.S. Pat. No. 3,437,401 granted Apr. 8, 1969, which, in turn, is a continuation-in-part of my abandoned application, Ser. No. 197,128 filed on May 23, 1962.

BACKGROUND OF THE INVENTION

An animated display device is disclosed in my copending application employing a light-intercepting pattern of motion lines embossed on the back face of a thin sheet of isotropic material, such as a thin transparent plastic sheet. A suitable embossing plate having the desired pattern of motion lines engraved thereon is disclosed for embossing the lines on the sheet. When the embossed light-intercepting sheet is interposed between a rotatable polarized sheet and a stationary polarized sheet, and a transparency having a picture painted thereon is positioned in the path of light transmitted through all of said sheets, portions of the picture overlying the embossed motion lines will be animated when the rotary polarizer is rotated. The motion lines are accurately embossed on the light-intercepting sheet in a variety of patterns to produce a variety of motions, such as, circular motion, linear motion, reciprocating motion, radially converging and diverging motions, and so forth.

If the picture on the transparency is a cross section of a V-8 engine, for example, the crankshaft of the engine overlies an area of the light-intercepting sheet having a pattern of motion lines embossed thereon to produce circular motion, the pistons overlie areas of the light-intercepting sheet having a pattern of motion lines to produce reciprocating motion, and so forth. The result is a very attractive, illuminated picture of a V-8 engine in which the parts appear to move. However, the portions of the picture which are not to be animated, such as, the engine block and the portions of the picture forming the background for the V-8 engine, for example, appear to blink twice per revolution of the rotary polarizer. That is they appear dark at one position of the rotary polarizer, light after 90° of rotation, dark again when the rotary polarizer has rotated 180°, and then light and dark again when the rotary has rotated 360°.

As disclosed in my copending application, this blinking effect can be eliminated by cutting away the portions of the stationary polarized sheet overlying the areas not to be animated. However, this adds an additional cost factor and requires a special stationary polarized sheet for each light-intercepting sheet wherein the polarized sheet is formed in a configuration to overlie only the areas of the light-intercepting sheet having the embossed motion lines.

BRIEF SUMMARY OF THE INVENTION

The present invention overcomes this blinking problem in a simpler, more economical manner by embossing the areas of the light-intercepting sheet overlying portions of the picture which are not to be animated with a "no-motion" pattern designed to eliminate the blinking effect without producing motion. In one specific embodiment a pattern of closely spaced dotlike indentations is embossed in the nonanimated areas of the light-intercepting sheet.

In accordance with one embodiment of the present invention, an animated display device comprises a light box, a stationary polarized sheet permanently fixed in position over a window in the light box, a rotary polarized sheet in the box overlying the stationary polarized sheet, and a light source in the box for passing light through the rotary and stationary polarized sheets. A transparency having a picture thereon to be animated can be bonded to a light-intercepting sheet having the desired pattern of motion lines and the no-motion pattern embossed thereon for producing the desired animation. The transparency and light-intercepting sheet together form a slide which can be inserted in the light box between the rotary and stationary polarized sheet which will appear to be animated when viewed through the stationary polarized sheet.

When the picture is to be changed, the slide comprising the transparency and light-intercepting sheet is removed and replaced by a different slide having a different picture transparency and light-intercepting sheet. In this manner a large number of different slides can be viewed in animated form through the same stationary polarized sheet, as contrasted with my copending application which discloses the use of a separate stationary polarized sheet for each transparency to be animated.

Other objects and features of novelty of the present invention will be specifically pointed out or will otherwise become apparent when referring, for a better understanding of the invention, to the following description taken in conjunction with the accompanying drawings.

DESCRIPTION OF THE PREFERRED EMBODIMENT

Figure 1:
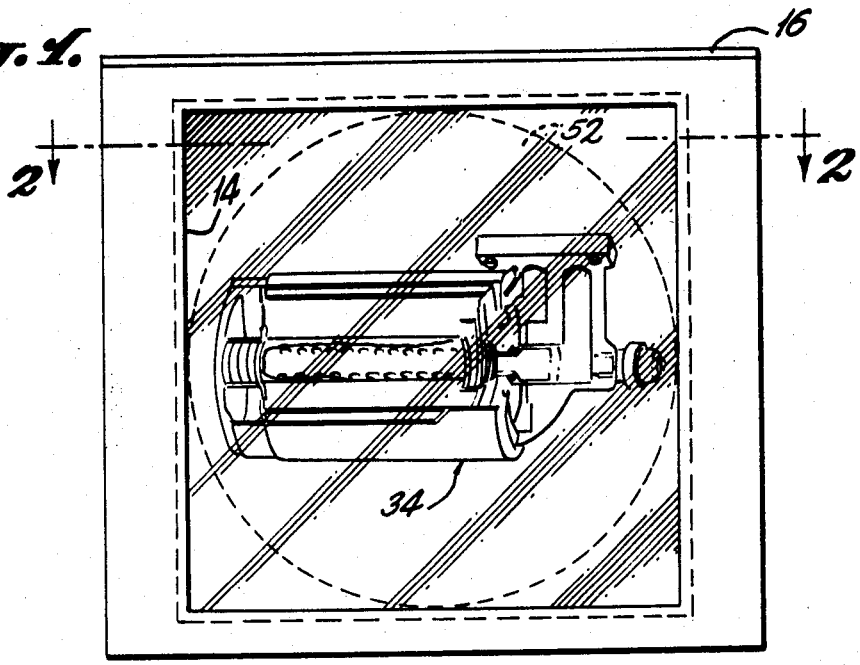
FIG. 1 is a front view of an animated display device embodying features of the invention.
Figure 2:
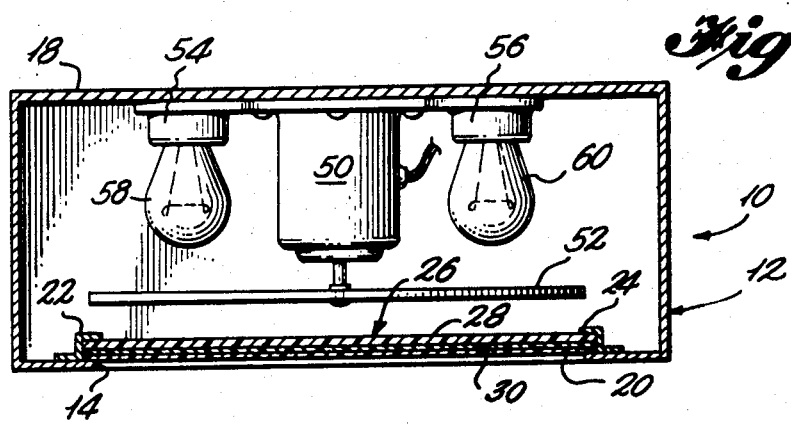
FIG. 2 is a sectional view taken along the line 2—2 of FIG. 1.

Referring to FIGS. 1 and 2 an animated display device 10 is illustrated which embodies features of the invention. It comprises a box 12 having a rectangular window opening 14 in the front wall. The top wall of the box 12 is formed by a lid 16 pivotally mounted on the backwall 18 of the box by hinges (not shown) to facilitate replacement of the picture being animated, as will be described.

A thin sheet 20 of polarized material is fixed to the inside of the front wall of the box in position to cover the opening 14. A pair of angle-shaped elements 22 and 24 are fixed on the inside of the front wall along the vertical sides of the opening 14 for slidably receiving a slide 26 having the picture to be animated. The slide 26 comprises a light-intercepting sheet 28 and a transparent sheet 30 bonded together along their marginal edges as illustrated by the dotted line 32 in FIG. 3. The elements 22 and 24 are open at their upper ends to enable the slide 26 to be removed from above when the lid 16 is open.

The thicknesses of the polarized sheet 20, the light-intercepting sheet 28 and the transparent sheet 30 is greatly exaggerated in FIG. 2 for purposes of clarity. By way of example, in the embodiment illustrated, the polarized sheet 20 and transparent sheet 30 are thin plastic sheets each having a thickness of about 0.005 inches. The light-intercepting sheet 28 also is a thin plastic sheet having a thickness of about 0.010 inches. The art work or picture to be animated is painted on the transparent sheet 30 and can be viewed through the polarized sheet 20.

In the embodiment illustrated, the picture painted on the transparent sheet is a filter 34 partially broken open to expose the internal parts thereof. The filter 34 has an inlet port 36 and an outlet port 38. A hollow core of filter material 40 is surrounded by a porous sleeve 42 with the wall of the central bore therethrough covered by a porous sleeve 44. An annular cavity 46 surrounds the porous sleeve 42 and communicates with the inlet port 36. The interior of the porous sleeve 44 communicates with the outlet port 38. Thus fluid enters the inlet port 36, flows into the annular cavity 44, through the porous sleeve 42 and filtering material 40, through the porous sleeve 44, into the central bore 46 and out through the outlet port 38. It is this fluid flow which is animated, as will be described.

An electric motor unit 50 is mounted inside the box 12 on the backwall 18 in alignment with the center of the opening 14. A thin sheet 52 of polarized material cut in the form of a circular disc is mounted on the output shaft of the motor unit 50 in position to overlie the opening 14, as best seen in FIG. 1. The motor unit 50 includes a gear reduction so as to rotate the disc 52 at about 60 r.p.m. A pair of conventional electric light sockets 54 and 56 are mounted on the backwall 18 for receiving light bulbs 58 and 60 which transmit light through the disc 52, the slide 26 and the stationary polarized sheet 20 to illuminate the picture.

When the polarized disc 52 is rotated with the slide 26 removed, the light transmitted through the sheets would be at a maximum at 180° positions of the polarized disc and a minimum at 180° positions of the discs 90° displaced from the maximum light positions. Therefore, for each revolution of the disc 52, the stationary polarized sheet 20, when viewed from the outside of the box, would go from light to dark upon rotation of the disc 52 through 90°, and from dark to light upon rotation of the disc through an additional 90°, and so forth. This is a common well-known effect created by rotating two polarized sheets relative to one another.

Figure 3:
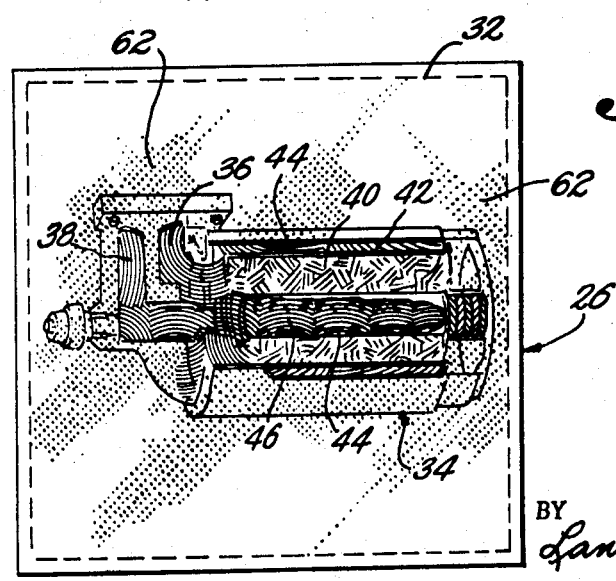
FIG. 3 is a view of the embossed face of the light-intercepting sheet employed in the animated display device of FIG. 1.

When the slide 26 is positioned behind the stationary polarized sheet 20 the entire filter 34 painted on the transparency is illuminated and can be seen through the stationary polarized sheet 20. The backface of the light intercepting sheet 28 (the face illustrated in FIG. 3) is embossed with different patterns of motion lines on the areas overlying the portions of the filter 34 to be animated. The inlet port 36 is embossed with closely spaced curve lines, the annular cavity 44 is embossed with two sets of concentric curved lines, the area overlying the filter 40 is embossed with a scattered pattern of lines, the central bore 46 is embossed with sets of curved lines, as is the outlet port 38. Reference is made to my copending application for a full and complete description of various embossed line patterns, including those patterns illustrated in FIG. 3 and the manner in which these embossed lines are formed. The effect of the motion line patterns illustrated in FIG. 3 is to produce travelling shadows which make it appear that oil is flowing into the inlet port 36 and the annular cavity 44, scattering its way through the filter material 40 flowing out the central bore 46 and the outlet port 38.

The animated display device 10, as described above is equivalent to the animated display device described in my copending application. However, in the device of my copending application, the nonanimated areas of the filter 34, such as the housing of the filter, for example, and the illuminated portions of the transparent sheet forming the background around the filter 34, would appear to blink on and off twice each revolution of the polarized disc 52 due to the aforementioned light dark effect that occurs when polarized sheets are rotated relative to one another.

The present invention overcomes this problem by embossing a no-motion pattern on the areas of the backface of the light-intercepting sheet 28 overlying the nonaminated portions of the filter 34 and the background surrounding the filter. In the embodiment illustrated, the no-motion pattern comprises a plurality of closely spaced dotlike indentations 62. As shown in FIG. 3 the indentations are located on closely spaced parallel lines disposed at an angle of 45° to the horizontal. There are about 30 indentations per inch along each of the lines and there are about 30 lines per inch which produces about 900 indentations per square inch. The diameter of the indentations in the backface is roughly equal to the spacing between the indentations along a line. Increasing the number of indentations per square inch further reduces the blinking effect. Similarly decreasing the indentations per square inch further reduces the blinking effect. Similarly decreasing the indentations per square inch would still improve the blinking effect, but to a lesser degree. About 900 dots per square inch is employed in the embodiment illustrated and produces a very satisfactory result.

As described in my copending application the motion lines can be embossed in the light-intercepting sheet 28 by a suitable embossing plate or die in a simple and economical manner. The alternately raised and depressed concentric rings, and scattered line pattern can be formed on the face of the embossing plate by a photoengraving process as described in my copending application, along with suitable pin pointlike projections for embossing the dotlike indentations.

When embossing the backface of the light-intercepting sheet, the embossing plate is preferably heated to a working temperature below the flow temperature of the material of which the light-intercepting sheet is made to facilitate the embossing operation. Similarly, the particular force or pressure applied should be under the flexural strength of the particular material at the temperature employed. Two particularly suitable plastic isotropic materials that may be employed for the light-intercepting sheets are vinyl acetate and a cellulose aceto-butyrate plastic sold under the trade name Tenite. In making the light-intercepting sheet 28 a Tenite acetate sheet having a thickness of about 0.01 inches was employed along with a temperature of about 250° to 275° F. and a pressure between 6,000 to 10,000 lbs. per square inch. Of course, the actual embossing pressure for a given material must be coordinated with the temperature and the time the embossing pressure is applied. A workable combination for a given material will determine the quality as well as production time of the individual light-intercepting sheets. The nature of the isotropic material used in the process is the determining factor at arriving at the temperatures and pressures to be employed in the embossing process. Where the nature of the isotropic material will permit, the embossing pressure can be exerted on the material in a cold state, although as already stated, heating the embossing plate to facilitate the embossing operation is preferred.

In the preferred embodiment shown, the depth of the embossing preferably is controlled so that the face of the sheet 28 adjacent to the transparent sheet 30 remains smooth. By keeping this face smooth, the transparent sheet 30 may, if desired, be eliminated and the picture painted directly on the smooth face of the sheet 28.

The spacing of the embossed lines in the motion areas is about 20 lines per inch. The finer the spacing, the smoother the shadow flow created. The patterns of motion lines in the form of concentric curved lines produces a linear motion effect as described above. The smaller the radius of curvature the slower the linear travelling shadow effect created, and the larger the radius of curvature the faster the shadow effect created.

It is believed that the reason the embossed dotlike indentations eliminate the blinking effect can be explained as follows: If a light-intercepting sheet were interposed between polarized sheets that rotate relative to one another, and a single indentation were embossed in the light-intercepting sheet, a circular motion effect would be produced about the indentation. By providing a number of indentations close together, the circular motion patterns are believed to interfere with one another with the net result that no distinct motion is created. Therefore, we have what has been referred to as a no-motion pattern as opposed to the various patterns of linear, circular, scattered and other types of motion lines described in my copending application.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

For example, the light-intercepting sheet 28 could be employed in slide projectors and other types of animated display devices other than the simple box type of animated display device illustrated in FIGS. 1 and 2.

What is claimed is:

1. A light-intercepting sheet for animating selected portions of a picture designed to overlie the light-intercepting sheet, comprising a sheet of light transmitting material having light-intercepting patterns of closely spaced generally parallel motion lines embossed in areas on one face thereof for producing traveling shadows on said selected portions of the picture in cooperation with a stationary and a rotary polarizer, other areas of said one face which would produce a blinking effect when the light-intercepting sheet is positioned between said stationary and rotary polarizers and light passed through said areas being embossed with a no-motion pattern to minimize said blinking effect.

2. The invention as defined in claim 1 wherein said sheet is made of isotropic material and the embossed areas impart a birefringentlike character to said sheet.

3. The invention as defined in claim 2 wherein said sheet is a thin sheet of optically inactive plastic material.

4. The invention as defined in claim 3 wherein said no-motion pattern comprises a plurality of small closely spaced dotlike indentations in said one face.

5. The invention as defined in claim 4 wherein the thickness of said sheet is about 0.01 inches.

6. The invention as defined in claim 4 wherein the density of the indentations is about 900 or more per square inch.

7. The invention as defined in claim 6 wherein the area per square inch covered by said indentations is substantially equal to or less than the area per square inch covered by the spaces between the indentations.

8. The invention as defined in claim 1 including a light-transmitting picture overlying the other face of said sheet, portions of said picture to be animated overlying said patterns of motion lines, portions of said picture which are not to be animated overlying said no-motion pattern.

9. The invention as defined in claim 8 wherein said picture is formed on a separate light-transmitting sheet, bonded to said other face of said light-intercepting sheet.

10. The invention as defined in claim 8 including a stationary polarized sheet, a rotary polarized sheet, means for rotating the rotary polarized sheet, and means for supporting said sheets in a manner to enable light to be transmitted through one of said polarized sheets and then through said light-intercepting sheet and then through the other of said polarized sheets whereby said picture can be illuminated with said selected portions thereof animated when viewed through one of said polarized sheets.